(12) United States Patent
Marrani et al.

(10) Patent No.: US 12,460,112 B2
(45) Date of Patent: Nov. 4, 2025

(54) FLUOROPOLYMER COMPOSITION

(71) Applicant: SYENSQO SPECIALTY POLYMERS ITALY S.P.A., Bollate (IT)

(72) Inventors: Alessio Marrani, Lecco (IT); Liubov Chernysheva, Milan (IT); Mattia Bassi, Milan (IT)

(73) Assignee: SYENSQO SPECIALTY POLYMERS ITALY S.P.A., Bollate (IT)

( * ) Notice: Subject to any disclaimer, the term of this patent is extended or adjusted under 35 U.S.C. 154(b) by 116 days.

(21) Appl. No.: 18/262,159

(22) PCT Filed: Jan. 17, 2022

(86) PCT No.: PCT/EP2022/050840
§ 371 (c)(1),
(2) Date: Jul. 19, 2023

(87) PCT Pub. No.: WO2022/157099
PCT Pub. Date: Jul. 28, 2022

(65) Prior Publication Data
US 2024/0141214 A1 May 2, 2024

(30) Foreign Application Priority Data
Jan. 20, 2021 (EP) .................................... 21152537

(51) Int. Cl.
| | | |
|---|---|---|
| C09J 127/18 | (2006.01) | |
| B32B 7/12 | (2006.01) | |
| B32B 15/08 | (2006.01) | |
| B32B 15/20 | (2006.01) | |
| B32B 27/28 | (2006.01) | |
| C09J 5/06 | (2006.01) | |
| C09J 11/06 | (2006.01) | |

(52) U.S. Cl.
CPC .............. *C09J 127/18* (2013.01); *B32B 7/12* (2013.01); *B32B 15/08* (2013.01); *B32B 15/20* (2013.01); *B32B 27/281* (2013.01); *C09J 5/06* (2013.01); *C09J 11/06* (2013.01); *B32B 2250/02* (2013.01); *B32B 2307/748* (2013.01); *C09J 2400/166* (2013.01); *C09J 2427/00* (2013.01); *C09J 2479/028* (2013.01)

(58) Field of Classification Search
CPC .. C08L 2205/025; C08L 27/18; C08F 214/24; C08F 214/26; C08F 214/262
See application file for complete search history.

(56) References Cited

U.S. PATENT DOCUMENTS

| | | | |
|---|---|---|---|
| 2,396,713 A | 3/1946 | Elmore | |
| 3,654,210 A | 4/1972 | Steininger et al. | |
| 3,759,883 A | 9/1973 | Kaufman et al. | |
| 4,036,802 A | 7/1977 | Poirier | |
| 4,391,940 A | 7/1983 | Kuhls et al. | |
| 4,548,986 A | 10/1985 | Suzuki et al. | |
| 4,837,267 A | 6/1989 | Malhotra | |
| 4,840,998 A * | 6/1989 | Shimizu | C08F 214/262 525/902 |
| 5,185,414 A * | 2/1993 | Mellish | C08F 214/26 526/228 |
| 2007/0166497 A1* | 7/2007 | Shimono | B32B 27/34 428/421 |
| 2009/0258958 A1 | 10/2009 | Ford | |
| 2013/0065018 A1 | 3/2013 | Park et al. | |
| 2020/0131290 A1 | 4/2020 | Wu et al. | |

FOREIGN PATENT DOCUMENTS

| | | | |
|---|---|---|---|
| CN | 101113189 A | 1/2008 | |
| CN | 104497191 A | 4/2015 | |
| CN | 107936168 A * | 4/2018 | |
| CN | 111057189 A * | 4/2020 | ............ C08F 259/08 |
| EP | 633274 B1 | 1/1997 | |
| JP | H11343317 A | 12/1999 | |
| WO | 11099414 A1 | 8/2011 | |
| WO | 2016096961 A1 | 6/2016 | |

OTHER PUBLICATIONS

Standard ASTM D1238-04—Standard Test Method for Melt Flow Rates of Thermoplastics by Extrusion Plastometer, 2004, p. 1-13 (13 pages).
International Search Report issued in International Application No. PCT/EP2022/050840 dated May 3, 2022 (3 pages).
Written Opinion issued in International Application No. PCT/EP2022/050840 dated May 3, 2022 (4 pages).

* cited by examiner

*Primary Examiner* — Mark S Kaucher
(74) *Attorney, Agent, or Firm* — Osha Bergman Watanabe & Burton LLP

(57) ABSTRACT

The present invention relates to a polymeric composition comprising a first polymer component C being selected from TFE/PAVE polymers comprising a small amount of chlorinated monomers selected from chlorotrifluoroethylene and dichlorodifluoroethylene and a second optional polymer component D being selected from TFE/PAVE polymers and being free from chlorine. The polymeric composition of the invention is characterized in that it has a total Cl content of from 0.01 to 0.25% by weight. The composition of the invention has very good adhesion on metals and plastics despite a very low total level of chlorine.

24 Claims, No Drawings

FLUOROPOLYMER COMPOSITION

TECHNICAL FIELD

This patent application is a national stage entry under 35 U.S.C. § 371 of International Application No. PCT/EP2022/050840 filed Jan. 17, 2022, which claims priority to the European Patent Application 21152537.3 filed on Jan. 20, 2021. The entire contents of these applications are explicitly incorporated herein by this reference.

The invention pertains to a fluoropolymer composition comprising certain copolymers based on tetrafluoroethylene (TFE) and a small controlled amount of chlorinated comonomers. The composition of the invention has a strong adhesion performance if compared with similar compositions not comprising the chlorinated comonomers, and contains a low total amount of chlorine. A low amount of chlorine is desirable because chlorine containing components are known to have a negative effect on some properties of the TFE (co)polymers, e.g. on their dielectrical properties. In the composition of the invention any negative effect from chlorine is minimized due to the very low amount. Also a low chlorine content makes the composition of the invention suitable for use also in applications wherein the content in chlorine is strictly regulated (e.g. in certain fields of electronics).

BACKGROUND ART

Tetrafluoroethylene(TFE)/perfluoroalkyl vinyl ether (PAVE) copolymers, are TFE based fluoropolymers which share many of their properties with PTFE (polytetrafluoroethylene) but, differently from PTFE, are melt-processable, i.e. their melts have a sufficiently low viscosity to allow processing with conventional molding, filming or extrusion equipment. TFE/PAVE copolymers wherein PAVE is perfluoro-(propyl vinyl ether) or a mixture of perfluoro-(propyl vinyl ether)(PPVE) and perfluoro (methyl vinyl ether) (PMVE) are commercially known as PFA or MFA polymers respectively and are characterized by a high melting point, high thermal stability, anti stick properties, chemical inertness and low dielectric constant, as well as good mechanical properties at room and elevated temperature. Generally, a commercial PFA polymer has a melting point higher than 280° C., and, depending on the grade, even higher than 305° C., and a continuous use temperature up to 260° C., wherein the parameter of continuous use temperature indicates the highest operating temperature the polymer can continuously withstand.

PFA and MFA and copolymers are commercialized by Solvay Specialty Polymers in the Hyflon® product line.

PFA/MFA copolymers have a large number of industrial applications, in particular they find application in electronics (such as e.g. in cable sheaths and substrates for circuit boards) because they have a very low dielectric constant and a very low dielectric loss.

However, due to their anti-stick properties, PTFE and PFA/MFA polymers show low adhesion to the metal and to other polymers. Thus, to achieve a good adhesion between a PTFE, a PFA/MFA polymer and another material, a primer (also referred to as binder) is required. Primers may impact negatively on the electrical properties of the material, and this clearly limits their application.

There is therefore a continued need for providing polymeric materials having essentially the same properties of the known PTFE, MFA and PFA polymers combined with a better adhesion to different types of substrates.

Chinese patent CN104497191 describes copolymers based on TFE with the introduction of recurring units of R1112 and other monomers to improve adhesion properties. The materials proposed contain about 3% by weight of chlorine atoms. Such a high level of chlorine has a significant negative impact in the dielectric properties of the polymer, moreover is too high for many applications where regulations require to minimize the level of chlorine compounds for environmental reasons. In particular the electronic industry has established very strict limits for chlorine content in the materials used in printed circuit boards.

There is therefore in particular a need for modified TFE based copolymers which have good adhesion properties on a variety of substrates and at the same time contain a very low level of chlorine.

SUMMARY OF INVENTION

The invention pertains to polymeric composition comprising a first polymer component C and, optionally, a second polymer component D, wherein the first polymer component C is selected from:
(i) a polymer $C_1$ comprising and preferably consisting of:
  from 75 to 99.89% by moles of recurring units derived from tetrafluoroethylene (TFE),
  from 0.01 to 5% by moles of recurring units derived from chlorotrifluoroethylene (CTFE),
  from 0.1 to 20% by moles of recurring units derived from one or more perfluoroalkylvinylether (PAVE),
(ii) a polymer $C_2$ comprising and preferably consisting of:
  from 75 to 99.9% by moles of recurring units derived from tetrafluoroethylene (TFE),
  from 0.01 to 5% by moles of recurring units derived from dichlorodifluoroethylene (R1112),
  from 0 to 20% by moles of recurring units derived from one or more perfluoroalkylvinylether (PAVE),
(iii) a polymer $C_3$ comprising and preferably consisting of:
  from 75 to 99.9% by moles of recurring units derived from tetrafluoroethylene (TFE),
  from 0.005 to 5% by moles of recurring units derived from dichlorodifluoroethylene (R1112),
  from 0.005 to 5% by moles of recurring units derived from chlorotrifluoroethylene (CTFE),
  with the provision that the total molar % of R1112 and CTFE does not exceed 5% of the total moles of recurring units in the polymer $C_3$,
  from 0 to 20% by moles of recurring units derived from one or more perfluoroalkylvinylether (PAVE),
(iv) or mixtures thereof.

The second optional polymer component D, does not contain chlorine containing recurring units and comprises, preferably consists, of:
  from 80 to 99.9% by moles of recurring units derived from tetrafluoroethylene (TFE)
  from 0.1 to 20% by moles of recurring units derived from one or more perfluoroalkylvinylether (PAVE).

The polymeric composition of the invention is further characterized in that it has a total Cl content of from 0.01 to 0.25% by weight.

DETAILED DESCRIPTION OF THE INVENTION

As mentioned above, the present invention relates to a polymeric composition comprising a first polymer component C and an optional second polymer component D.

The first polymer component C is selected from one or more copolymer of tetrafluoroethylene (TFE) with one or more chlorinated monomers selected from chlorotrifluoroethylene (CTFE) and dichlorodifluoroethylene (R1112) and optionally perfluoroalkylvinylethers.

To note, dichlorodifluoroethylene may exist in 3 different isomers, cis-1,2-dichloro-1,2-difluoro-ethylene, trans-1,2-dichloro-1,2-difluoro-ethylene, and 1,1-difluoro-2,2-dichloro-ethylene. All isomers individually and mixtures thereof are suitable for the present invention, and the abbreviation R1112 used herein intends to encompass all isomers and mixtures thereof, however, the 1,2-dichloro-1,2-difluoro isomers are preferred, individually or as a mixture.

The first polymer component C is selected from the following polymer components C1, C2 and C3 or mixtures thereof:

C1: a polymer comprising and preferably consisting of
  from 75% to 99.89%, preferably from 86% to 99.68%, more preferably from 90% to 99.45% by moles of recurring units derived from TFE,
  from 0.01% to 5%, preferably from 0.02% to 4%, more preferably from 0.05% to 3% by moles of recurring units derived from CTFE,
  from 0.1% to 20%, preferably from 0.3% to 10%, more preferably from 0.5% to 7% by moles of recurring units derived from one or more PAVE.

C2: a polymer comprising and preferably consisting of
  from 75% to 99.99%, preferably from 86% to 99.68%, more preferably from 90% to 99.45% by moles of recurring units derived from TFE,
  from 0.01% to 5%, preferably from 0.02% to 4%, more preferably from 0.05% to 3% by moles of recurring units derived from R1112,
  from 0 to 20%, preferably from 0.1 to 20%, more preferably from 0.3 to 10%, even more preferably from 0.5 to 7% by moles of recurring units derived from one or more PAVE.

C3: a polymer comprising and preferably consisting of
  from 75% to 99.99%, preferably from 86% to 99.68%, more preferably from 90% to 99.45% by moles of recurring units derived from TFE,
  from 0.005% to 5%, preferably from 0.02% to 4%, more preferably from 0.05% to 3% by moles of recurring units derived from CTFE,
  from 0.005% to 5%, preferably from 0.02% to 4%, more preferably from 0.05% to 3% by moles of recurring units derived from R1112,
  from 0 to 20%, preferably from 0.1 to 20%, more preferably from 0.3 to 10%, even more preferably from 0.5 to 7% by moles of recurring units derived from one or more PAVE,
  with the provision that the total molar % of R1112 and CTFE does not exceed 5%, preferably does not exceed 4%, more preferably does not exceed 3% of the total moles of recurring units in the polymer C3.

When present in the composition of the present invention the second optional polymer component D is a polymeric material which does not contain chlorine (and by "does not contain chlorine" it is intended that Cl atoms if at all present must be less than 30 ppm, preferably less than 10 ppm, more preferably less than 1 ppm) and comprises, preferably consists, of:
  from 80% to 99.9%, preferably from 90% to 99.7%, more preferably from 93% to 99.5% by moles of recurring units derived from TFE,
  from 0.1% to 20%, preferably from 0.3% to 10%, more preferably from 0.5% to 7% by moles of recurring units derived from one or more PAVE.

In the present invention any perfluoroalkylvinylether (PAVE) can be used.

Preferred PAVE are in accordance with formula (I)

$$CF_2=CF-O-R_f \quad (I)$$

wherein $R_f$ is a $C_1$-$C_6$ perfluoroalkyl group.

The perfluoroalkylvinylether (PAVE) of formula (I) is preferably selected from the group consisting of perfluoromethylvinylether (PMVE) of formula $$CF_2=CF-O-CF_3,$$

perfluoroethylvinylether (PEVE) of formula $$CF_2=CF-O-CF_2-CF_3$$

and perfluoropropylvinylether (PPVE) of formula $$CF_2=CF-O-CF_2-CF_2-CF_3.$$

Also mixtures of different PAVEs can be used herein.

Without being bound by theory it is believed that the main role of PAVE in the present invention is to regulate the melting temperature and the viscosity of the melt. If fact, as it will be detailed below, compositions according to the present invention find application e.g. in the construction of printed circuit boards in electronics. In order to be suitable for this application the compositions of the invention must be able to withstand the soldering temperatures of SMT (surface mount technology) which is the standard soldering technique used in circuit board construction, which is around 288° C. At the same time the compositions of the invention should be melt processable at temperatures which are not too high to avoid energy consumption and risk of thermal degradation or carbonization. A person skilled in the art of PFA/MFA polymers would know how to vary the PAVE content in a TFE copolymer in order to fine-tune its melting temperature and viscosity of the melt as the cited prior art on PFA/MFA polymers and the common general knowledge in the field provides several examples in this regard.

As indicated above, it is preferred that the polymer components C and D consist only of the mentioned recurring units derived from TFE, CTFE, R1112 and PAVE according to the mentioned ranges. However, in a less preferred embodiment the polymer components C (including the polymers C1, C2 and C3) and D may further comprise recurring units derived from one or more additional fluorinated monomers different from TFE, CTFE, R1112 and PAVE. If present, such recurring units derived from one or more fluorinated monomer different from TFE, CTFE, R1112 and PAVE are preferably less than 10% mol, more preferably less than 5% mol, even more preferably less than 1% mol with respect to the total recurring units of the polymer component C or D respectively.

The term "additional fluorinated monomer" in the context of the present invention is intended to denote an ethylenically unsaturated monomer comprising at least one fluorine atom. The choice of this additional fluorinated monomers (when present) is not particularly limited, any fluorinated monomer can be used. Preferably the additional fluorinated monomer is a fully halogenated monomer, preferably a fully fluorinated monomer.

In case the additional fluorinated monomer comprises one or more other halogen atoms different from fluorine (Cl, Br, I), Cl containing monomers must not be present in polymer component D. Naturally, if Cl containing recurring units are present in such additional fluorinated monomers, the amount of Cl has to be considered in the total amount of Cl of the component and of the entire composition.

Non-limiting examples of additional fluorinated monomers include:

$C_3$-$C_8$ perfluoroolefins such as hexafluoropropylene (HFP);

$C_2$-$C_8$ hydrogenated fluoroolefins such as vinyl fluoride, 1,2-difluoroethylene and trifluoroethylene;

perfluoroalkylethylenes of formula $CH_2=CH-R_{f0}$, wherein $R_{f0}$ is a $C_1$-$C_6$ perfluoroalkyl group;

chloro- and/or bromo- and/or iodo-$C_2$-$C_6$ fluoroolefins different from chlorotrifluoroethylene;

partially fluorinated alkylvinylethers of formula $CF_2=CFOR_{f1}$, wherein $R_{f1}$ is a $C_1$-$C_6$ partially fluorinated alkyl group;

$CF_2=CFOX_0$ (per)fluoro-oxyalkylvinylethers, wherein $X_0$ is a $C_1$-$C_{12}$ oxyalkyl group which can be non-fluorinated, partially fluorinated or fully fluorinated, having one or more ether groups, such as perfluoro-2-propoxy-propyl group;

$CF_2=CFOCF_2OR_{f2}$ (per)fluoro-oxyalkylvinylethers, wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups such as —$C_2F_5$—O—$CF_3$;

functional (per)fluoro-oxyalkylvinylethers of formula $CF_2=CFOY_0$, wherein $Y_0$ is selected from a $C_1$-$C_{12}$ alkyl group or (per)fluoroalkyl group, a $C_1$-$C_{12}$ oxyalkyl group, or a $C_1$-$C_{12}$ (per)fluorooxyalkyl group, each $Y_0$ also having one or more ether groups and comprising a carboxylic or sulfonic acid group, in its acid, acid halide or salt form;

bis-olefins of formula $R_AR_B=CR_C$-T-$CR_D=R_ER_F$, wherein $R_A$, $R_B$, $R_C$, $R_D$, $R_E$ and $R_F$, equal to or different from each other, are selected from the group consisting of H, F, Cl, $C_1$-$C_5$ alkyl groups and $C_1$-$C_5$ (per)fluoroalkyl groups, and T is a linear or branched $C_1$-$C_{18}$ alkylene or cycloalkylene group, optionally comprising one or more ether oxygen atoms, preferably at least partially fluorinated, or a (per)fluoropolyoxyalkylene group, e.g. $CH_2=CH-(CF_2)_6-CH=CH_2$;

fluorodioxoles, preferably perfluorodioxoles.

End chains, impurities, defects and minor amount of other comonomers (these latter in amounts generally not exceeding 0.01%, with respect to the total amount of moles of recurring units of the polymer component) may be present in polymer components C or D, without these substantially affecting the properties of the polymer component.

Preferably the polymeric composition of the invention has a melting temperature between 250° C. and 350° C., more preferably between 260° C. and 330° C. and a melt flow index (MFI) between 0.1 and 30 more preferably between 0.5 and 20 and most preferably between 1 and 20 g/10' (grams for 10 minutes, as measured at 372° C. under a weight of 5 Kg, according to ASTM D1238).

The polymeric composition of the present invention may contain additional ingredients beyond the first polymer component C and the second optional polymer component D such as additives, pigments, rheology modifiers, stabilizers, mould release agents, plasticizers, lubricants, thermal stabilizers, light stabilizers, adhesion promoters and antioxidants, fillers and other common additives for polymeric compositions. In particular the compositions of the invention may contain one or more adhesion promoters, preferably in an amount of from 0.1 to 10% by weight of the polymeric composition. Preferred adhesion promoters for use herein are organosilicon compounds. More preferably adhesion promoters for the polymeric composition of the invention are selected from trimethoxysilane derivatives, most preferably from ((3-glycidoxypropyl) trimethoxysilane, (3,3,3-trifluoropropyl) trimethoxysilane and mixtures thereof.

If present, all the additional ingredients of the composition of the invention beyond said first polymer component C and said second polymer component D preferably do not contain chlorine atoms.

It is preferred that the total amount of the first and second polymer components C and D makes up at least 80%, more preferably at least 90%, even more preferably at least 95 by weight of the composition of the present invention.

The polymeric composition of the invention is characterized by its total content in chlorine atoms (Cl) which must be comprised from 0.01 to 0.25% by weight, preferably from 0.02 to 0.2% by weight, more preferably from 0.02 to 0.15% by weight, most preferably from 0.04 to 0.1% by weight.

As described above Cl is contained in the first polymer component C which consists of one or more polymer selected from polymers C1, C2 and C3. In case the first polymer component C has a total Cl content of from 0.01 to 0.25% by weight, as required by the invention, then the composition of the invention may be free of second polymer component D. Alternatively, in case the first polymer component C has a total Cl content higher than 0.25% by weight, the composition of the invention must also comprise a second polymer component D, as described above, which does not contain chlorine atoms and is present in an amount such that the total chlorine content of the composition of the invention is from 0.01 to 0.25% by weight.

In other words, the composition of the invention is characterized by its total level in chlorine, which can be achieved by using a first polymer component C having such total level of chlorine, or by combining a first polymer component C having a higher level of chlorine than it is desired and blending it with a second polymer component D, which does not contain chlorine.

This second embodiment wherein the composition of the invention comprises a first polymer component C containing chlorine and a second polymer component D which does not contain chlorine in relative amounts such that the composition of the invention has a total Cl content of from 0.01 to 0.25% by weight, is preferred as a surprisingly better adhesion has been observed in comparison with compositions comprising only the polymer component C and having the same amount of chlorine atoms. Without being bound by theory we believe that, since adhesion is linked to the amount of chlorine in the composition, this may be linked to the formation of distributed micro domains of component C having higher adhesion which overall provide a better adhesion profile for the entire layer.

Preferably, in polymeric compositions according to the invention, the polymer component C is from 1 to 99%, more preferably from 10 to 60% and polymer component D from 99 to 1% more preferably from 40 to 90%, all percentages being expressed as percent by weight of the total weight of the polymeric composition.

The polymers used in the compositions of the invention are essentially TFE/PAVE polymers. TFE/PAVE polymers are known in the industry as PFA and MFA and are commercialized for example by Solvay Specialty Polymers under the brand name Hyflon®. The TFE/PAVE polymers used as polymer component C in the present invention are distinguished from the known TFE/PAVE polymers in that they are modified with the introduction of recurring units derived from chlorinated monomers selected from CTFE and R1112. These modified TFE/PAVE polymers can be manufactured using the known polymerization techniques described in the literature for TFE/PAVE copolymers, just adding the chlorinated monomers to the polymerization environment. Reference is made for example to European Patent EP633274B1 and PCT application WO2016096961, both from Solvay Specialty Polymers.

In general polymers for use in the present invention as polymer components C or D can be prepared in aqueous polymerization medium, using emulsion and/or suspension polymerization techniques in a pressurized reactor, feeding the monomers in such reactor and initiating the polymerization using a radical initiator. Surfactants such as fluorinated surfactants and/or non fluorinated surfactants may be used during polymerization to help stabilize the emulsion. Conventional chain transfer agents may also be used to control molecular weight and viscosity of the polymers.

Typically the preparation of polymers suitable for the present invention occurs in emulsion and the resulting material is a polymer finely dispersed in an aqueous medium in the form of a latex. For subsequent processing the polymer is extracted from the latex using known techniques (such as e.g. coagulation by freezing). The extracted polymer is washed with demineralized water and dried at high temperature (e.g. 150.160° C.) to remove residual humidity.

The resulting polymers are melt processable and therefore can be blended accordingly to form the composition of the invention with known technique such as melting the polymers and blending them in a blender or an extruder or by blending the powders and subsequently melting the blended powders.

The polymeric composition of the invention can be used to form molded articles or films. In particular the composition of the invention, due to its improved adhesion properties both on metals and on other polymers, is useful in multilayer articles, particularly multilayer films such as in particular multilayer laminates.

Films from the polymeric composition of the invention may be manufactured with any known method. For example the polymeric composition of the invention in the form of particles, powder mixture or pellets can be molten and formed into a film using molding, a conventional film extruder or a press using known methods. The film can be formed as a stand alone film or on a metallic or polymeric substrate (non limiting examples e.g. copper or polyimide).

Alternatively the polymeric composition of the invention may be dispersed in the form of a fine powder within a liquid carrier (e.g. water or a suitable organic solvent as common the art) and a film can be cast by depositing the dispersion on a suitable substrate (non limiting examples e.g. copper or polyimide) which can be later removed or maintained as part of the laminate. The solvent can be removed using known techniques e.g. evaporation. Typically, before or after evaporation of the solvent the polymeric composition is heated at a temperature above the melting temperature of the polymeric composition, typically 300° C. or more: in such condition the fine powders of the composition melt forming a uniform layer or coating.

Also, the polymeric composition of the invention may be dispersed in the form of a fine powder within a liquid carrier including a precursor of a dielectric material (e.g. a solution of Poly Amic Acid in a polar aprotic solvent, where the Poly Amic Acid may be obtained for example by reacting a suitable dianhydride with a diamine, or a solution of soluble Polyimide) and a film can be cast by depositing the obtained varnish on a suitable substrate (non limiting examples e.g. copper or polyimide) which can be later removed or maintained as part of the laminate. The obtained film may be finally heated at a temperature suitable for the complete imidization of the polyimide (e.g. above 300° C.) to optimize the mechanical and electrical properties.

As known to the person skilled in the art of coating and film-making using fluoropolymers, the film deposition can be accompanied by thermal and mechanical treatments (e.g. press or calendering at high T e.g. above 300° C.) in order to consolidate the film or the laminate.

In particular, the compositions of the invention are particularly suited to applications in electronics, especially as a component in substrate materials for printed circuit boards.

In fact fluoropolymers and in particular PTFE and TFE/PAVE polymers have excellent electrical properties, such as a very low dielectric constant and a very low dielectric loss. Also their mechanical and thermal dilation properties makes them excellent options for electronics, but their lack of adhesion both to metals (e.g. the copper conductors in printed circuit boards) and to other polymers (e.g. the polyimide substrates typically used in printed circuit boards) has limited their industrial application. In some cases primer layers of complex compositions or adhesive resin layers have been used in order to form circuit boards using PTFE or PFA/MFA polymers, however, in the construction of a printed circuit boards, it is highly preferred, for the preservation of the electrical properties, that these additional layers are absent.

Particularly in the recent years, technologies supporting the deployment of 5G networks are in high demand. 5G networks are characterized by the use of higher frequency signals (above 1 GHz and typically between 25 and 39 GHz) than existing networks. As known to the skilled person, electronic circuits operating at higher frequency require the use of supporting materials having even more rigid standards. In particular in terms of low dielectric constant and low dielectric loss.

Printed flexible circuit boards are typically created using conductor metal clad laminates which include a metal layer (or 2 metal layers when the metal is present on both sides of the laminate) deposited onto a suitable substrate. Printed circuit boards are typically created starting from these laminates and the electrical properties of the substrate are key to the performance of the material. Any conductive metal can be used in principle in a metal clad laminate, in practical terms the metal used is typically copper, however also silver or gold may be used for particular applications, despite their higher cost. The following description will focus on copper, however it is intended that also other conductive metals can be used instead of copper, and that constructions using these other conductive metals are within the scope of the invention.

A common construction for copper clad laminates uses a polyimide substrate. However the electrical properties of a standard polyimide substrate can still be improved. Fluoropolymers film have lower dielectric constant and lower dielectric loss than polyimides, however they have poor adhesion. The polymeric compositions of the present invention may find application in copper (or other conductive metal) clad laminates forming films which can be used as substrates on which the copper layer can be adhered to or as intermediate layers between a polyimide substrate and a copper layer. The benefit of having a fluoropolymer layer directly in contact with the metallic layer are very high because the low dielectric constant and the low dielectric loss of the polymeric composition of the invention cause a reduction in stray currents and loss of signal, improves the signal to noise ratio in particular when high frequencies such as those used in 5G connections. At the same time the compositions of the present invention allow constructing flexible metal clad laminates without the use of adhesive resins or primer layers which would negatively impact the dielectric property of the material while maintaining the strongest adhesion both with the metal and also, if present, with the base polymeric layer (e.g. polyimide layer).

A typical construction of a metal clad laminate according to the present invention is "metal layer/layer of composition of the invention/polyimide layer". Or, for laminates with metal on both faces, "metal layer/layer of composition of the invention/polyimide layer/layer of composition of the invention/metal layer".

Should the disclosure of any patents, patent applications, and publications which are incorporated herein by reference conflict with the description of the present application to the extent that it may render a term unclear, the present description shall take precedence.

The invention will now be described in more details with reference to the following examples whose purpose is merely illustrative and not intended to limit the scope of the present invention.

The examples will refer to the synthesis of polymer components C, polymer components D being commercially available e.g. from Solvay Specialty Polymers under the brand name Hyflon®. Also the examples describe the formation of a composition according to the invention, and the preparation of laminates using a film made from the composition of the invention which is adhered to a copper layer on one side and to a polyimide layer on the other. Data are presented showing how compositions according to the invention provides excellent adhesion on both sides of the laminate.

EXAMPLES

List of Materials Used

Monomers:

In all examples using R1112, the material used was a mixture of cis and trans 1,2 dichloro-1,2 difluoroethylene (ECHA List Number 938-149-7). TFE is tetrafluoroethylene, CTFE is chlorotrifluoroethylene, PMVE is perfluoro (methyl vinyl ether) ($C_3F_6O$), PPVE is perfluoro (propyl vinyl ether) ($C_5F_{10}O$). All monomers were supplied by Solvay Specialty Polymers.

Polymer Component D:

Terpolymer TFE 95%/PMVE 3%/PPVE 2% (powder with $D_{50}$=3 μm, $D_{95}$=8 μm, $T_m$=290° C., MFI 15 g/10'-5 Kg) supplied by Solvay Specialty Polymers.

Polymer Component C-A:

Copolymer TFE 99.5%/R1112 0.5% by moles In an AISI 316 steel vertical autoclave equipped with baffles, and stirrer working at 500 rpm, 3.5 liters of demineralized water were introduced. Then the temperature was brought to a reaction temperature of 65° C., once this temperature has been reached, 50 g of a solution at 34% wt of a cyclic fluorosurfactant of formula:

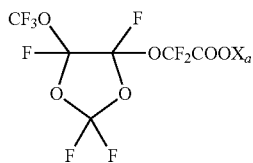

wherein $X_a$ is $NH_4$ and 6 ml of R1112 were introduced. Next, pure TFE was added via a compressor, until reaching a pressure of 20 abs bars. Then, 15 ml of solution of Ammonium persulfate (APS) in demineralized water at a concentration of 3% wt were fed. Once the polymerization was started, 1 ml of R1112 were charged in the reactor by using a graduated metering every 75 grams of TFE. The polymerization pressure was maintained constant by feeding the above mentioned pure TFE; when 500 g of the TFE gas were fed the reactor was cooled at room temperature, the polymer was discharged in latex form, degassed and then post treated by freezing coagulation. The polymer was then washed with demineralized water and dried at 200° C. for 16 hours. The resulting powder had a particle size $D_{50}$=3 μm, $D_{95}$=5 μm, the melting point of the polymer obtained was $T_m$=326° C. The Chlorine content in the polymer powder as calculated from its monomer composition is 0.35% by weight.

Polymer Component C-B:

Terpolymer TFE 94.69%/PMVE 4.98%/CTFE 0.33% by moles.

In an AISI 316 steel vertical autoclave equipped with baffles, and stirrer working at 500 rpm, 3.5 l of demineralized water were introduced. Then the temperature was brought to a reaction temperature of 65° C.; once this temperature has been reached, 25 g of a solution at 34% wt of cyclic fluorosurfactant (the same used in the former example relating to the synthesis of polymer component C-A), CTFE (chlorotrifluoroethylene) to generate a pressure variation of 1 bar, and PMVE (perfluoromethylvinylether) to generate a pressure variation of 0.5 Bars were introduced. Next, a mixture of TFE and perfluoromethylvinylether (PMVE) in molar ratio 97%/3% was added via a compressor, until reaching a pressure of 20 abs bars. Then, 15 ml of solution of Ammonium persulfate (APS) in demineralized water at a concentration of 3% wt were fed. The polymerization pressure was maintained constant by feeding the above mentioned TFE/PMVE mixture; when 500 g of the gas were fed the reactor was cooled at room temperature, the polymer was discharged in latex form, degassed and then post treated by freezing coagulation. The polymer and then was washed with demineralized water and dried at 200° C. for 16 hours. The resulting powder had a particle size $D_{50}$=2 μm, $D_{95}$=4 μm, the melting point of the polymer obtained was $T_m$=271° C. The Chlorine content in the polymer powder as calculated from its monomer composition is 0.11% by weight.

Polymer Component C-C:

Terpolymer TFE 96.2%/PMVE 2.8%/R1112 1% by moles.

Same procedure as for C-A was followed. Instead of TFE, a mixture of TFE/PMVE in molar ratio 97%/3% was added via a compressor, until reaching a pressure of 20 abs bars. The resulting powder had a particle size $D_{50}$=2 μm, $D_{95}$=5 μm, the melting point of the polymer obtained was $T_m$=300° C. MFI 3.2 g/10'-5 Kg. The Chlorine content in the polymer powder as calculated from its monomer composition is 0.65% by weight.

Preparation of Laminates

The materials above were used to make copper clad laminates according to the following procedure:

Polymer components C and D in powder form were mixed in dry form to obtain the desired composition and homogenized in a jar mill. The powders were then dispersed in an organic solvent (methyl ethyl ketone) in the presence of dispersant Fluorolink® PEG45 (at 5% wt based on the total amount of polymer), thus forming a dispersion at 30% solids. The dispersion was stirred for 30 min and then cast on a Kapton® 500HN general-purpose polyimide film, of 125 Micron Thickness used as a substrate thus forming a first laminate. The film of the composition of the invention was cast using a bar coater (Elcometer 4340 motorized film applicator). The height of the blade of the bar coater is managed in order to obtain a thickness of 60 micrometers on the dried film. The cast film was conditioned at room temperature for 2 hours. Then the film was dried in a conventional static oven at 320° for 30 min in a nitrogen gas atmosphere. After cooling, a first laminate is obtained having a film made from the composition of the invention on one side and a Kapton® film on the other. A second laminate was then prepared by overlapping a copper foil onto said first laminate on the surface made from the composition of the invention. The second laminate was then pressed in a hydraulic press Carver with a 15 ton pressure and the lamination was carried out at a temperature of 325° C. for 20 minutes.

Adhesion Test on Laminates

For each laminate the peel strength was measured between the layer made from the composition of the invention and the copper layer, and also independently between the layer formed from the composition of the invention and the Kapton® layer.

The peel strength test is carried out by T-peel test at 90° and 50 mm/min on 1 cm width strips (length 10 cm) in a Dynamometer (Instron 5965), according to ASTM D-1876. The strips are affixed to the instrument after being delaminated for a length of 1 cm using a scalpel or other suitable method in order to form flaps of the individual layer which can be clamped on the instrument, according to the standard procedure. It was not possible to measure peel strength higher than 30N/cm due to film breakage. Therefore for all samples where the adhesion was so high to cause a mechanical failure of the film the peel strength was reported as higher than 30 N/cm.

TABLE 1

Peel strength data

| Sample | Composition (wt %) | Peel str. Kapton (N/cm) | Peel Str. Cu (N/cm) | CL content % wt | MFI(*) (g/10') |
|---|---|---|---|---|---|
| E1 | 15% C-A 85% D | 8.7 | >30 | 0.05% | 10 |
| E2 | 30% C-A 70% D | >30 | >30 | 0.1% | 9 |
| E3 | 35% C-B 65% D | 18 | >30 | 0.04% | 2 |
| E4 | 30% C-C 70% D | >30 | >30 | 0.02% | 10 |
| E5c | 100% C-C (comp) 0% D | 0.2 | >30 | 0.65% | 3.2 |
| E6c | 100% D (comp) | 0 | 0.2 | 0 | 13 |

(*)MFI was measured in grams for 10 minutes, at 372° C., under a 5 Kg weight, in accordance to ASTM D1238.

As it can be seen from the data presented, a standard PFA polymer (E6c comparative example 100% polymer component D) does not have any adhesion on both polyimide and copper. Also E6c shows that a composition made from 100% polymer component C-C and having a total level of chlorine of 0.65% wt has good adhesion on copper but poor adhesion on polyimide. Instead compositions according to the invention combining polymer components C-A, C-B and C-C with polymer component D in relative amounts such that the total chlorine level is between 0.01% wt and 0.25% wt, in accordance to the invention as claimed, show good adhesion on both substrates at a very low chlorine content.

What is claimed is:

1. A polymeric composition comprising:
    a first polymer component C said polymer component being selected from
    (ii) a polymer C2 comprising:
        from 75 to 99.89% by moles of recurring units derived from tetrafluoroethylene (TFE),
        from 0.01 to 5% by moles of recurring units derived from dichlorodifluoroethylene (R1112),
        from 0.1 to 10% by moles of recurring units derived from one or more perfluoroalkylvinylether (PAVE),
    (iii) a polymer C3 comprising:
        from 75 to 99.89% by moles of recurring units derived from tetrafluoroethylene (TFE),
        from 0.005 to 5% by moles of recurring units derived from dichlorodifluoroethylene (R1112),
        from 0.005 to 5% by moles of recurring units derived from chlorotrifluoroethylene (CTFE),
        with the provision that the total molar % of R112 and CTFE does not exceed 5% of the total moles of recurring units in the polymer C3,
        from 0.1 to 10% by moles of recurring units derived from one or more perfluoroalkylvinylether (PAVE),
    (iv) or mixtures thereof
    a second optional polymer component D, said polymer component D not comprising chlorine containing recurring units and comprising:
        from 80 to 99.9% by moles of recurring units derived from tetrafluoroethylene (TFE)—from 0.1 to 20% by moles of recurring units derived from one or more perfluoroalkylvinylether (PAVE)
    said polymeric composition being further characterized in that it has a total Cl content of from 0.01 to 0.25% by weight.

2. The polymeric composition according to claim 1 wherein dichlorodifluoroethylene (R1112) is 1,2 dichloro, 1,2 difluoro ethylene.

3. The polymeric composition according to claim 1 wherein said one or more perfluoroalkylvinylether (PAVE) is selected from compounds having the following general formula:

$$CF_2=CF-O-R_f \qquad (I)$$

wherein $R_f$ is a $C_1$-$C_6$ perfluoroalkyl group.

4. The polymeric composition according to claim 3 wherein said one or more perfluoroalkylvinylether (PAVE) is selected from perfluoromethylvinylether (PMVE), perfluoroethylvinylether (PEVE), perfluoropropylvinylether (PPVE) and mixtures thereof.

5. The polymeric composition according to claim 1 having a melting temperature between 250° C. and 350° C. and a melt flow index (MFI) between 0.1 and 30 g/10' (as measured at 372° C. under a weight of 5 Kg, according to ASTM D1238).

6. The polymeric composition according to claim 1 said composition also comprising 0.1 to 10% by weight based on the total weight of the composition of one or more adhesion promoters.

7. The polymeric composition according to claim 1, said composition having a total content in chlorine atoms of from 0.02 to 0.2% by weight.

8. A polymeric film comprising the polymeric composition of claim 1.

9. A multilayer laminate wherein at least one layer comprises the polymeric composition of claim 1.

10. The multilayer laminate according to claim 9 comprising at least three superimposed layers, wherein
at least one layer comprises the polymeric composition said layer having a first surface and a second surface,
at least one layer is an electrically conductive layer and
at least one layer comprises a polyimide,
and wherein said electrically conductive layer and said layer comprising a polyimide are directly adhered respectively onto said first and said second surface of the layer comprising the polymeric composition.

11. A method for making a film from the polymeric composition of claim 1 the method comprising the steps of
melting the polymeric composition to form a molten composition, and
form a film from the molten composition.

12. A method for casting a film comprising the polymeric composition of claim 1 the method comprising the following steps, in order:
i) dispersing the polymeric composition in water or a suitable solvent to form a dispersion
ii) distributing the dispersion on a suitable substrate
iii) evaporating the solvent.

13. The method according to claim 12, also including the step, performed after step ii) or after step iii) of heating the polymeric composition at a temperature above 300° C.

14. The polymeric composition according to claim 1 comprising:
(ii) a polymer C2 consisting of:
from 75 to 99.89% by moles of recurring units derived from tetrafluoroethylene (TFE),
from 0.01 to 5% by moles of recurring units derived from dichlorodifluoroethylene (R1112),
from 0.1 to 10% by moles of recurring units derived from one or more perfluoroalkylvinylether (PAVE),
(iii) a polymer C3 consisting of:
from 75 to 99.89% by moles of recurring units derived from tetrafluoroethylene (TFE), —from 0.005 to 5% by moles of recurring units derived from dichlorodifluoroethylene (R1112),
from 0.005 to 5% by moles of recurring units derived from chlorotrifluoroethylene (CTFE),
with the provision that the total molar % of R112 and CTFE does not exceed 5% of the total moles of recurring units in the polymer C3,
from 0.1 to 10% by moles of recurring units derived from one or more perfluoroalkylvinylether (PAVE),
(iv) or mixtures thereof a second optional polymer component D, said polymer component D not comprising chlorine containing recurring units and consisting of:
from 80 to 99.9% by moles of recurring units derived from tetrafluoroethylene (TFE)
from 0.1 to 20% by moles of recurring units derived from one or more perfluoroalkylvinylether (PAVE)
said polymeric composition being further characterized in that it has a total Cl content of from 0.01 to 0.25% by weight.

15. The polymeric composition according to claim 1 having a melting temperature between 260° C. and 330° C. and a melt flow index (MFI) between 0.5 and 20 g/10' (as measured at 372° C. under a weight of 5 Kg, according to ASTM D1238).

16. The polymeric composition according to claim 6 wherein the adhesion promoters are selected from organo-silicon compounds.

17. The polymeric composition according to claim 1, said composition having a total content in chlorine atoms of from 0.02 to 0.15% by weight.

18. The polymeric composition according to claim 1, wherein said polymer component C is from 10 to 60% by weight of the polymeric composition and said polymer component D from 40 to 90% by weight of the polymeric composition.

19. A polymeric composition comprising:
a first polymer component C said polymer component being selected from (i) a polymer C1 comprising:
from 75 to 99.89% by moles of recurring units derived from tetrafluoroethylene (TFE),
from 0.01 to 5% by moles of recurring units derived from chlorotrifluoroethylene (CTFE),
from 0.1 to 20% by moles of recurring units derived from one or more perfluoroalkylvinylether (PAVE),
(ii) a polymer C2 comprising:
from 75 to 99.9% by moles of recurring units derived from tetrafluoroethylene (TFE),
from 0.01 to 5% by moles of recurring units derived from dichlorodifluoroethylene (R1112),
from 0 to 20% by moles of recurring units derived from one or more perfluoroalkylvinylether (PAVE),
(iii) a polymer C3 comprising:
from 75 to 99.9% by moles of recurring units derived from tetrafluoroethylene (TFE),
from 0.005 to 5% by moles of recurring units derived from dichlorodifluoroethylene (R1112),
from 0.005 to 5% by moles of recurring units derived from chlorotrifluoroethylene (CTFE),
with the provision that the total molar % of R1112 and CTFE does not exceed 5% of the total moles of recurring units in the polymer C3,
from 0 to 20% by moles of recurring units derived from one or more perfluoroalkylvinylether (PAVE),
(iv) or mixtures thereof
a second polymer component D, said polymer component D not comprising chlorine containing recurring units and comprising:
from 80 to 99.9% by moles of recurring units derived from tetrafluoroethylene (TFE)
from 0.1 to 20% by moles of recurring units derived from one or more perfluoroalkylvinylether (PAVE)
said polymeric composition being further characterized in that it has a total Cl content of from 0.01 to 0.25% by weight; and
wherein said polymer component C is from 1 to 99% by weight of the polymeric composition and said polymer component D from 99 to 1% by weight of the polymeric composition.

20. A multilayer laminate wherein at least one layer comprises the polymeric composition of claim 19.

21. The multilayer laminate according to claim 20 comprising at least three superimposed layers, wherein
at least one layer comprises the polymeric composition said layer having a first surface and a second surface,
at least one layer is an electrically conductive layer and
at least one layer comprises a polyimide,
and wherein said electrically conductive layer and said layer comprising a polyimide are directly adhered respectively onto said first and said second surface of the layer comprising the polymeric composition.

22. A method for making a film from the polymeric composition of claim 19 the method comprising the steps of
melting the polymeric composition to form a molten composition, and
form a film from the molten composition.

23. A method for casting a film comprising the polymeric composition of claim 19 the method comprising the following steps, in order:
- i) dispersing the polymeric composition in water or a suitable solvent to form a dispersion
- ii) distributing the dispersion on a suitable substrate
- iii) evaporating the solvent.

24. The method according to claim 23, also including the step, performed after step ii) or after step iii) of heating the polymeric composition at a temperature above 300° C.

* * * * *